Feb. 7, 1961 T. HAFNER 2,971,170

TWO WIRE SURFACE WAVE TRANSMISSION LINES

Filed Feb. 25, 1958

INVENTOR.
THEODORE HAFNER

United States Patent Office 2,971,170
Patented Feb. 7, 1961

2,971,170

TWO WIRE SURFACE WAVE TRANSMISSION LINES

Theodore Hafner, 1501 Broadway, New York, N.Y.

Filed Feb. 25, 1958, Ser. No. 717,347
10 Claims. (Cl. 333—9)

This invention is a continuation in part of U.S. Serial No. 385,489 filed October 12, 1953, and relates to surface wave transmission lines especially of the two-wire type used to connect television home antennas to the receiver.

One of the objects of this invention is a surface wave transmission line consisting of a two-wire transmission line of more or less standard construction and adapted to serve separately or simultaneously as a surface wave transmission line.

Another object of the invention is a surface wave transmission line of the form of a two-wire transmission line connected at one or both ends thereof to suitable surface wave launching or receiving device or wave matching device adapted to transform the surface wave into a coaxial wave and including an impedance matching device adapting the impedance of the wave matching device to the impedance of a coaxial two-wire terminating line connecting to a receiver on one end of the terminating transmission line and/or to an antenna on the other end of the terminating transmission line.

A further object of the invention is to provide a surface wave transmission line permitting simultaneous transmission of one range of frequencies in the form of a surface wave surrounding and propagated along the outside surface of the two-wire wave transmission line and to transmit another range of frequencies over the wires of the two-wire transmission line themselves.

A more specific object of the invention is to provide a two-wire transmission line adapted on the outside thereof to transmit surface waves of a VHF frequency range and at the same time to transmit another range of frequencies lying below the VHF range through wires of the two-wire transmission line themselves.

Still another object of the invention is a matching device permitting adaptation of the surface wave to a coaxial wave and at the same time passage of the two-wire wave frequency range therethrough without affecting or being affected by the surface wave frequency range.

Still further, an object of the invention is an impedance transformer adapted to transform the impedance of the surface wave matching devices to the impedance of a terminating two-wire line connected to the receiver on one end of such terminating transmission line and/or to the antenna on the other end of the terminating transmission line and also permitting passage of the two-wire line frequency range from the two wires forming the surface wave transmission line to the two-wire lines terminating at receiver and antenna, respectively.

Figure 1:
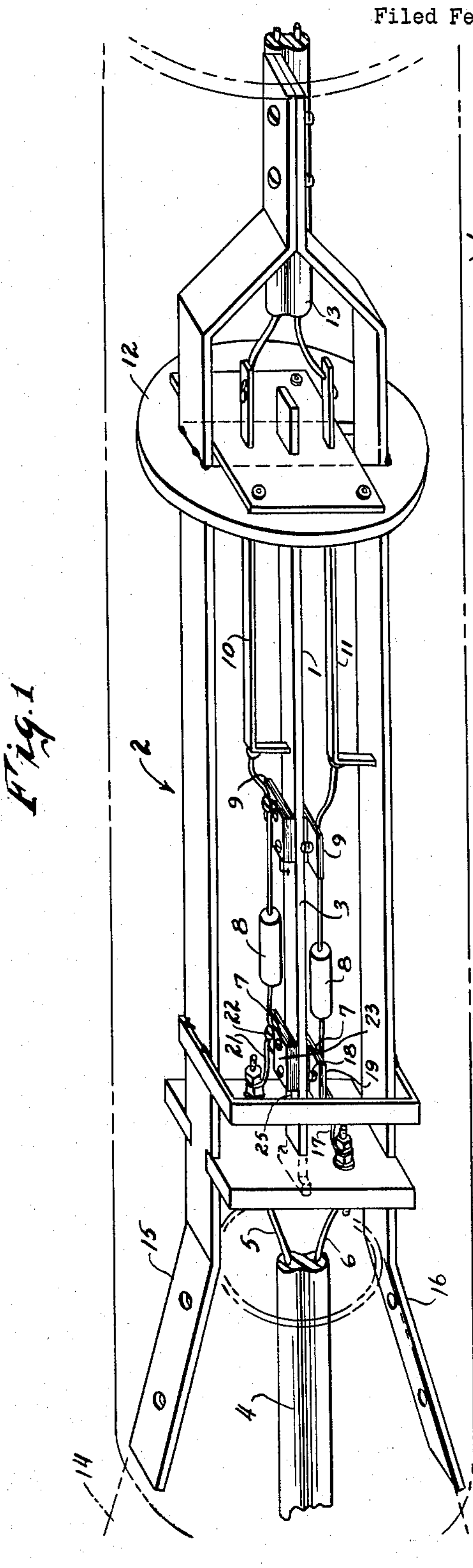
Figure 2:
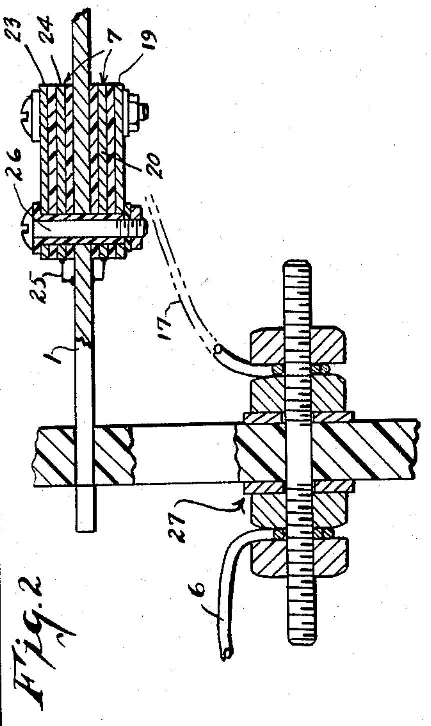

These and other objects of the invention will be more fully described in connection with the drawings attached herein in which Fig. 1 represents in a perspective view a diagrammatical embodiment of some of the principles of the invention; Fig. 2 shows a cross section therethrough along lines 2—2 of Fig. 1.

Figure 3:
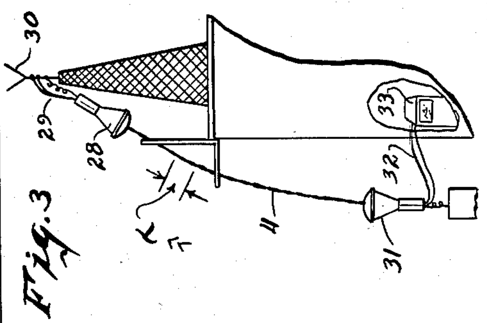

Fig. 3 shows a preferred method of suspension for a surface wave twin-line in accordance with the invention.

In Fig. 1, following the construction illustrated in the above-mentioned copending U.S. application, 1 represents the center conductor or strip of impedance transformer 2 at the end, 3, of which, normally, the surface wave conductor is attached.

In accordance with the invention, the surface wave conductor consists of the two parallel wires of tape 4; the wires 5, 6 are connected, each over a cascade connection of a capacity 7, an inductance 8 and another capacity 9 to center conductor or strip 1.

In the particular example shown, twin-line tape 4 serves for the transmission of surface waves of the UHF range or a range from about 450–900 mc. and simultaneously for the transmission of two-line wire waves of the VHF range or a frequency range below the UHF range, i.e., extending from, say, channel 1 to 13 or from a frequency of a few megacycles to 214 megacycles. The approximate dimensions for capacitors 7 and 9 are microfared while the inductance of inductances 8 is about $3.10^{-7}$ henry.

In the impedance matching device 2, lateral conductors or strips 10, 11 extend parallel to central conductor 1 and substantially in its plane, arranged in a manner similar to that shown in the above-mentioned copending U.S. patent application. Distance and size of lateral conductors 10, 11 are so determined that the wave resistance in conductors 10, 11 is substantially equal to that of surface wave transmission twin-line 4.

Lateral conductors 10, 11 are led insulatingly through termination conductor plate 12 to be connected to the wires of low frequency or VHF twin-line, schematically indicated at 13 and adapted to carry relatively low frequencies or VHF, as well as relatively high frequencies, over a relatively short distance to antenna or receiver, respectively, as the case may be.

Naturally, other and more exact dimensions are a matter of experiment and adaptation within the scope of any experienced radio engineer.

Furthermore, in accordance with the invention, any appropriate type of twin-lead may be used for either surface wave transmission twin-line as well as for the terminating twin lines.

However, in accordance with the principles of the surface wave transmission, and especially as apparent from experiments underlying this invention, it has been found useful to use as a surface wave transmission twin-line a twin line having a rather re-inforced dielectric in order to obtain the field concentration required for efficient surface wave transmission.

Under these circumstances, while the flat twin-lead can be used in accordance with the invention, the lack of sufficient dielectric material especially for long-distance application may result in excessive loss.

Apart from that, it has been found that such flat twin-lines are subject to flapping movements in heavy wind, especially at the relatively tensioned condition required for efficient surface wave transmission; such flapping is reduced and mechanical resistance enhanced by twisting the twin line 4 around its axis preferably with a lay of several wave lengths.

Mutual wave resistance of conductors 10, 11 cannot be readily predetermined theoretically because the metal part of the launcher or receiver horns schematically indicated in Fig. 1 at 13, and which is attached to end-plate 14 by means of longitudinal outer brackets 15, 16, respectively, are situated in the field of the twin-wire wave along conductors 10, 11.

As apparent from Fig. 1 and in greater detail from the cross section of Fig. 2, one twin-lead wire schematically indicated at 17 is attached by fixation screw 18 to one electrode 19 of capacitor 7 while the other twin-lead wire schematically indicated at 21 is attached by means of fixation screw 22 to an electrode 23 of another capacitor 7 of the capacitance-inductance-capacitance cascades diagrammatically indicated in Fig. 1 at 7, 8, 9. The other and adjacent electrodes 20, 24 of the two capacitors are electrically interconnected at 25 and at the same time also connected and attached to central conductor 1.

As apparent from the front view of Fig. 2 of the physical arrangement of by-pass elements 7, 8, 9 (Fig. 1), the two capacitors 20, 24 are insulatingly attached by means of insulating bolts 26 to center conductor 1 while fixation screws 18, 22 also serve to connect inductance coils, diagrammatically indicated at 8 to other fixation screws and capacitors, not shown, arranged and attached in a similar manner to center conductor as fixation screws 18 and 22 and capacitors 9, 9 have been attached to center conductor 1, at a point spaced from attachment bolts 26 as shown in Fig. 1.

As apparent from Fig. 2, fixation screws 18, 22 also serve over terminal 27 to connect to the two wires 5, 6 of surface wave conductor twin-line 4.

Fig. 3 illustrates a practical example for a suspension of a surface wave transmission system such as disclosed in Figs. 1, 2, and 3.

In Fig. 3 the surface wave transmission twin-line 4 is shown to be connected in a manner similar to that illustracted in Figs. 1, 2 at one end over surface wave launcher 28 and termination twin-line 29 to an antenna structure schematically indicated at 30 and adapted to receive frequencies of the VHF range as well as those of UHF range.

At its other end, surface wave transmission twin-line 4 is connected over surface wave receiver 31 and another termination twin-line 32 to a television receiver 33 adapted to receive VHF as well as UHF frequencies.

In order to reduce wind resistance and increase the stability of the surface wave transmission twin line 4 with a minimum of disturbance to the surface wave field itself, twin-line 4 is twisted about its axis over at least the greater part of its free length preferably several times and at a lay which is large against wave length or which consists of several wave lengths, of the operating frequency range or at least a substantial portion thereof.

The invention is not limited to the exact arrangement and dimensions of twin-lines, capacitors, inductances, and any other type of mechanical and electrical elements described or illustrated but may be applied in any form or manner whatsoever without departing from the scope of this disclosure.

I claim:

1. In a surface wave transmission system, a surface wave conductor in the form of a symmetrical two-wire transmission line, covered by insulation and capable of transmitting between its wires a range of relatively low frequencies; said insulation being so dimensioned as to concentrate the surface wave field surrounding said line within a cylindrical space of the order of wave length dimension at a range of frequencies substantially above said relatively low frequency range, surface wave launching and receiving means including conical horns disposed, one at each end of said two-wire line and each gradually decreasing in diameter from a diameter corresponding to the diameter of the field surrounding said line toward the end of said two-wire line, and a pair of longitudinal conducting means starting at the smaller end of said conical horns, one forming substantially the continuation of said two-wire line in a direction opposite of said two-wire line, and the other forming substantially a continuation of said cone in a direction opposite to said cone; said longitudinal conducting means also forming a coaxial transmission line for transmitting the waves corresponding to said surface wave field; the wires of said two-wire line being connected, respectively, to said two longitudinal conducting means at intermediate points thereof facing each other and another terminating symmertical two-wire line transmission also connected to said conducting means at said intermediate points so as to receive between its wires both said frequency ranges.

2. System according to claim 1, wherein said surface wave conducting and said terminating two-wire lines are substantially of the same construction.

3. System according to claim 1, wherein said surface wave conducting two-wire line is twisted around its axis to reduce wind resistance.

4. System according to claim 1, wherein said surface wave conducting two-wire line is adapted to transmit surface waves of a frequency range from about 450 to 900 mc. while transmitting at the same time between its wires a frequency range substantially below said surface wave frequency range.

5. System according to claim 1, wherein said surface wave conducting two-wire line has an insulation increased with respect to the terminating two-wire line to increase concentration of the surface wave field.

6. System according to claim 1, comprising filter means intercoupled between each of the wires of said surface wave conducting two-wire line and intermediate points associated therewith on said longitudinal conducting means to permit the low frequency range to pass directly to the corresponding wire of said terminating two-wire line while the high frequency range is transmitted directly through that longitudinal conducting means to said terminating two-wire line.

7. System according to claim 6, wherein each of said filter means includes a cascade connection of a capacitance, inductance and another capacitance; said cascade connections having ends connected to each other, the surface wave conducting two-wire line having its wires connected to one junction point in each of said cascade and the wires of the terminating two-wire line being connected to the other junction points of the cascades.

8. System according to claim 1, wherein one of said conducting means consists of a single central conductor and the other conducting means consists of two outer conductors parallel to the central conductor and arranged at opposite sides thereof; said outer conductors being connected at one end to said cone and at the other end to each other; there being further provided two intermediate conductors in the space between said central and outer conductors, respectively, and substantially parallel thereto, said intermediate conductors having one end connected to said intermediate points, on said central conductor and on one of said outer conductors, respectively, said intermediate points being also connected to the wires of the surface wave conducting two-wire line; and said intermediate conductors being connected at the other end to the wires of the terminating two-wire line.

9. System according to claim 8, wherein the wires of the surface wave conducting two-wire line are connected over inductances to said intermediate and wherein the junction points of said inductances with said wires of said surface wave conducting two-wire line are connected over capacitances to separate points along said central conductor.

10. System according to claim 9, wherein said capacitances and said inductances are supported on said central conductor, on opposite sides thereof.

References Cited in the file of this patent

FOREIGN PATENTS

| | | |
|---|---|---|
| 154,867 | Australia | Jan. 21, 1954 |